United States Patent
Larsen

(10) Patent No.: US 8,196,508 B2
(45) Date of Patent: Jun. 12, 2012

(54) CONTINUOUS FRUIT PITTING BY SINGULARIZATION OF FRUIT PIECES

(76) Inventor: Lawrence J. Larsen, Spokane, WA (US)

(*) Notice: Subject to any disclaimer, the term of this patent is extended or adjusted under 35 U.S.C. 154(b) by 0 days.

(21) Appl. No.: 12/886,759

(22) Filed: Sep. 21, 2010

(65) Prior Publication Data

US 2012/0070555 A1    Mar. 22, 2012

(51) Int. Cl.
A23N 4/12 (2006.01)
A47J 23/00 (2006.01)
A47J 25/00 (2006.01)

(52) U.S. Cl. ............ 99/547; 99/556; 99/559; 99/565; 99/490; 426/485

(58) Field of Classification Search ............ 426/485, 426/484; 99/490, 547, 549, 556, 559, 561, 99/565
See application file for complete search history.

(56) References Cited

U.S. PATENT DOCUMENTS

| | | | |
|---|---|---|---|
| 1,726,719 A | | 9/1929 | Schau |
| 2,681,088 A | * | 6/1954 | Krupp et al. ............ 99/544 |
| 3,731,615 A | * | 5/1973 | Margaroli et al. ............ 99/559 |
| 3,817,168 A | | 6/1974 | Maytum |
| 4,009,650 A | * | 3/1977 | Lascelles et al. ............ 99/490 |
| 4,122,951 A | * | 10/1978 | Alaminos ............ 209/545 |
| 5,329,843 A | | 7/1994 | Cheung |
| 5,870,949 A | * | 2/1999 | Cimperman et al. ............ 99/559 |
| 6,410,872 B2 | * | 6/2002 | Campbell et al. ............ 209/577 |
| 7,320,280 B2 | | 1/2008 | Politino et al. |
| 2002/0155204 A1 | * | 10/2002 | Castro ............ 426/484 |

* cited by examiner

Primary Examiner — D. Lawrence Tarazano
Assistant Examiner — Stephanie Cox
(74) Attorney, Agent, or Firm — John C. Meline

(57) ABSTRACT

Described is a pitting machine, system and process that singularizes or individualizes fruit pieces, such as cherries, olives, dates and plums and that attempts to remove pits and pit material from each fruit piece. A conveyor comprises depressions, wells or receptacles for accepting fruit pieces for processing. The conveyor accepts fruit pieces into wells, passes the fruit pieces into a pitting area wherein the pitting machine removes pit material from the fruit pieces by a matrix of punching needles or pitting needles. The matrix moves in an oscillatory fashion in synchronization with generally continuous movement of the fruit pieces engaged in the conveyor. The singularization enables easier and better processing, sorting, and quality checking of fruit pieces. Quality checking may be done before and after pitting of fruit pieces. Quality checking may include desired color and size of each fruit piece. Quality checking virtually ensures successful or sufficient removal of pits and pit material. Any fruit piece that fails quality checking can be ejected or rejected from the conveyor.

21 Claims, 9 Drawing Sheets

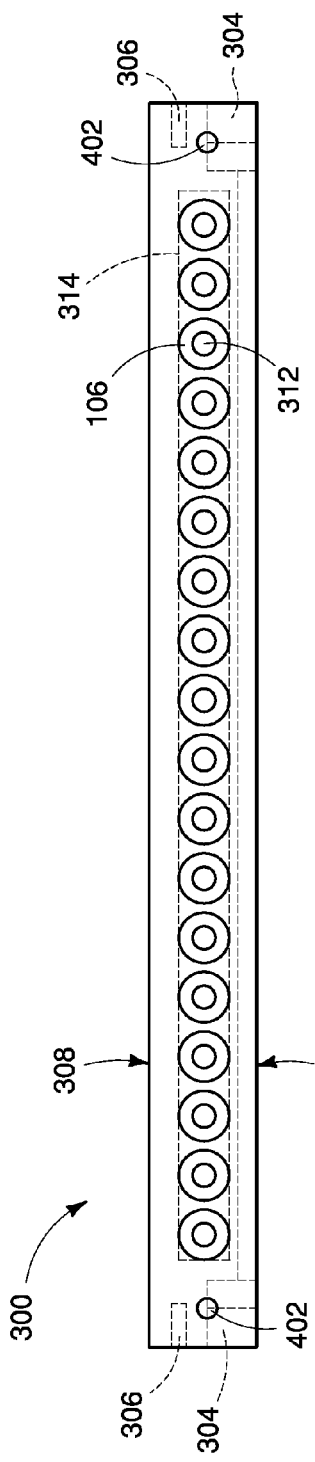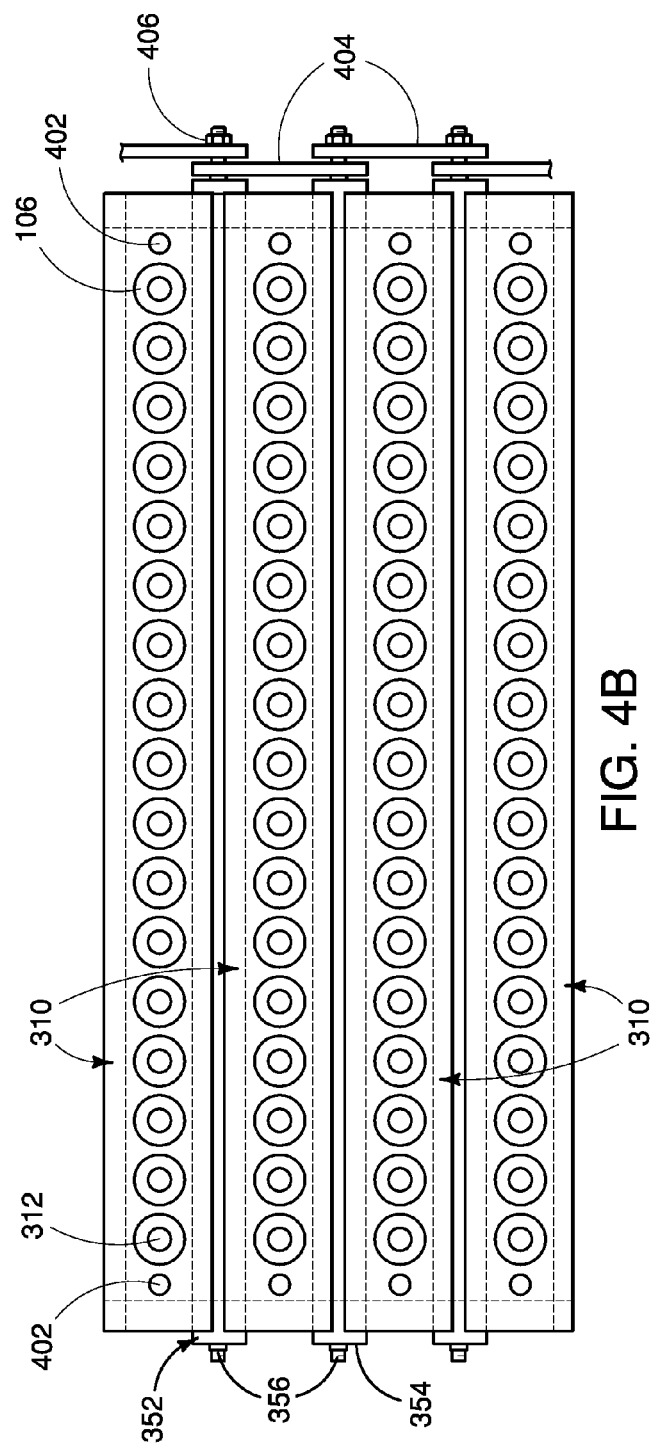
FIG. 4A
FIG. 4B

CONTINUOUS FRUIT PITTING BY SINGULARIZATION OF FRUIT PIECES

FIELD OF INVENTION

The present invention relates to a machine for sorting, or pitting, or sorting and pitting fruit pieces such as cherries, olives, dates and plums.

BACKGROUND

Historically, pitting machines have yielded a small percentage of fruit whose pit or portion of a pit remained in the fruit piece. A typical mechanism for removing a fruit pit or pit material has been the use of a punching needle that passes through the fruit, engages the pit or pit material, and ejects the pit or pit material from the individual fruit piece. One cause of missed pits or missed pit material has been that the pit is not centered beneath the punching needle such that the pit or pit material is too far to one side of the fruit piece. Other times, the missed pit or missed pit material breaks, leaving a portion of the pit or pit material in the fruit piece. Another source of a missed pit or missed pit material is the difficulty of adequately detecting the presence of a missed pit or missed pit material in fruit pieces that have passed through a pitting machine.

Producers, buyers, sellers and consumers of pitted fruits are highly discouraged by the presence of any remaining pits or pit material in pitted fruits. Increasingly, producers, buyers and sellers of pitted fruits are hesitant to market the fruit due to an increased number of lawsuits by consumers who have tragically bit into one of these left over pits and reaped a broken tooth or other malady. Producers, buyers and sellers have tried to minimize the occurrence of tragic missed pit or pit material events by having manual laborers check the fruit pieces after the fruit pieces have been processed through pitting machines. This process is labor intensive, expensive and unreliable.

SUMMARY

This Summary is provided to introduce a selection of concepts in a simplified form that are further described below in the Detailed Description. This Summary is not intended to identify key or essential features of the claimed subject matter. The Summary is not intended to be used to limit the scope of the claimed subject matter.

One aspect of the present invention provides an improved method, system and machine for the removal of pits and pit material from fruit pieces. One implementation of a pitting system according to the present invention comprises a process to singularize fruit pieces by allowing only one fruit piece in each of a plurality of depressions or wells in a conveyor. In one particular implementation, in order to singularize fruit pieces, fruit pieces are introduced onto a conveyor. As fruit pieces move up an inclined portion of the conveyor, excess fruit pieces that are not accepted into an available depression in the conveyor continue to fall or roll back toward a lower part of the conveyor until the particular fruit piece is accepted into an available depression in the conveyor.

In the same or different implementation, fruit pieces resting in each depression can be screened by a detector such as an optical reader. Each fruit piece is measured and compared against one or more predetermined threshold values of pre-made measurements. For example, fruit can be measured for color and compared against an acceptable threshold value for color. If the measured value from a particular fruit piece does not meet a corresponding acceptable threshold value, the fruit piece is ejected from the depression and off of the conveyor. Rejected fruit pieces can be further processed or discarded.

Another aspect of the invention is removal of pits and pit material from fruit pieces. In the same or different implementation as previously described, the pitting system comprises a punching head which in turn is comprised of a matrix of punching needles, each punching needle being a predetermined size and shape for driving pits and pit material from a respective fruit piece and through an opening in the corresponding depression or well in which the fruit piece is resident. After the punching needle pushes the pit or pit material from the fruit piece, and through an opening in the bottom of the respective depression, the pit or pit material from each fruit piece is collected and discarded. Each punching needle is cleaned for a subsequent punching cycle and freed from any attached pit, pit material and fruit material, when the punching needle protrudes from the opening of the depression. Each punching needle is effectively wiped clean by brushes, water jets or other means.

In another aspect of the invention, a matrix of punching needles punches according to an oscillatory movement that is in synchronization with the conveyor. This allows the conveyor to be continuously moving throughout the pitting process. In a preferred implementation, the conveyor moves at a constant speed.

In another aspect of the invention, after each fruit piece has been punched, the conveyor moves the fruit pieces from a punching or pitting region to a screening area to screen the fruit pieces for any residual pit or pit material that could be left in a particular fruit piece or in a depression or well in the conveyor. If a pit or pit material is detected in a particular fruit piece, that particular, singularized fruit piece can be ejected from the depression and off the conveyor. Rejected fruit pieces are collected for subsequent processing. Subsequently, pitted fruit pieces that pass individual screening fall from or are removed from each depression or well.

These and other aspects of the invention are described further in the Detailed Description.

BRIEF DESCRIPTION OF THE DRAWINGS

The novel features believed characteristic of the subject matter are set forth in the appended claims. The subject matter itself, however, as well as a preferred mode of use, are best understood by reference to the following Detailed Description of illustrative implementations when read in conjunction with the accompanying drawings, wherein:

FIG. 4A is an overhead view of a link of a conveyor shown in FIG. 3A according to an exemplary implementation of the pitting machine;

FIG. 4B is an overhead view of links and conveyor rods shown in FIG. 3B according to a second exemplary implementation of the pitting machine;

DETAILED DESCRIPTION

While the invention is described below with respect to a preferred implementation, other implementations are possible. The concepts disclosed herein apply equally to other devices, systems and methods for separating pits or pit material from fruit pieces. Furthermore, the concepts applied herein apply more generally to the processing of food and other materials. The invention is described below with reference to the accompanying figures.

Figure 1:
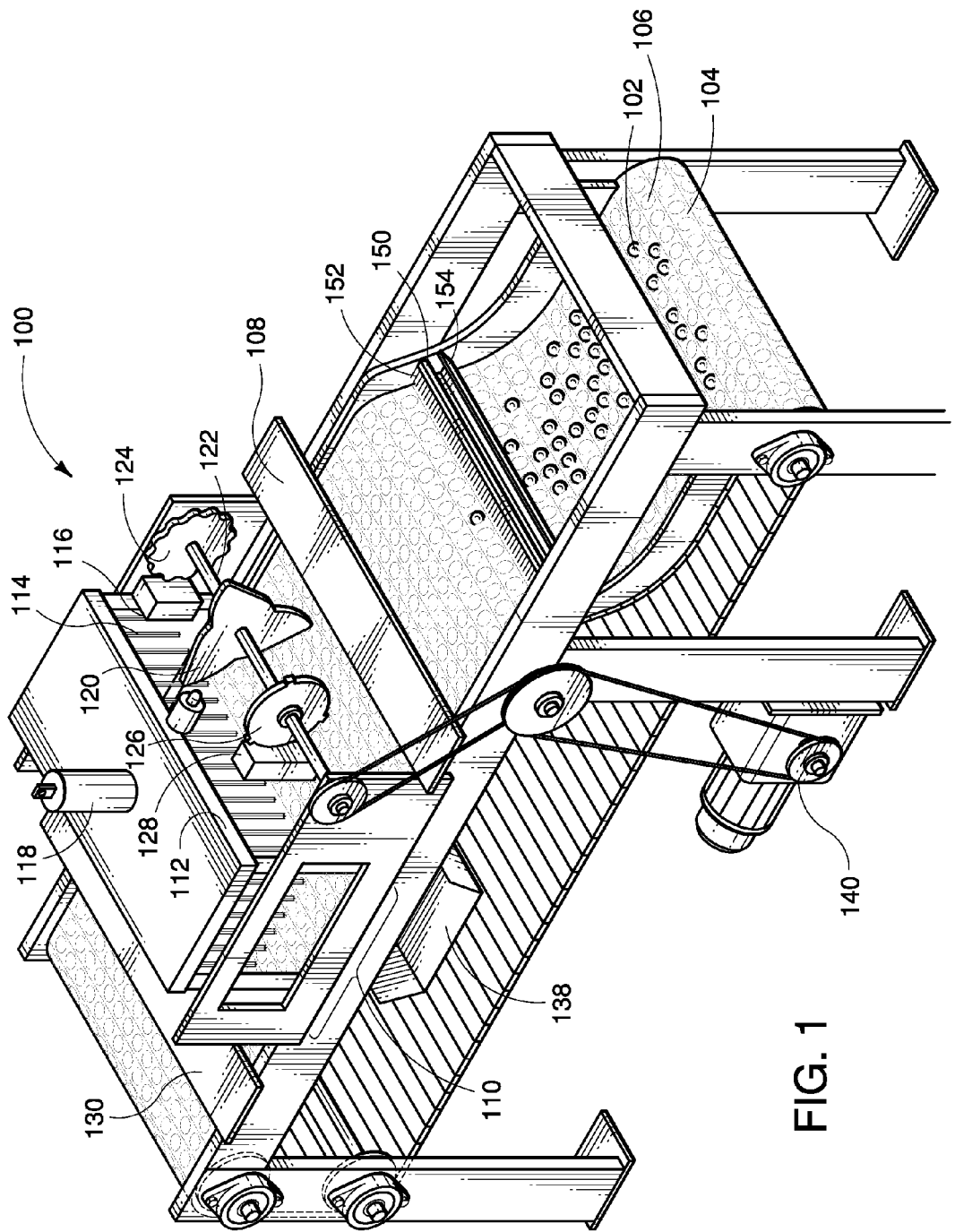
FIG. 1 is a perspective view of a pitting machine according to an exemplary implementation.

FIG. 1 shows a perspective view of one exemplary implementation of a pitting machine 100 according to the subject matter described herein. With reference to FIG. 1, fruit pieces 102 are conveyed from right to left in FIG. 1. Fruit pieces 102 are placed onto the conveyor 104 as the conveyor 104 moves in a counter-clockwise motion. The movement can be continuous or may stop and start, or may be continuous but may operate at varying speeds over time. In a preferred implementation, the movement is continuous and operates at a relatively fixed speed over time.

After fruit pieces 102 are loaded onto the conveyor 104, the conveyor 104 brings the fruit pieces 102 up an incline. As the conveyor 104 operates, the fruit pieces 102 are shuffled backward or down the incline along the conveyor 104 and fall into depressions or wells 106 in the links of the conveyor 104, one fruit piece 102 per well 106. Accordingly, the fruit pieces 102 are individualized or singularized such that each well 106 holds exactly one fruit piece 102. In this way, fruit pieces 102 are prepared for further processing. The wells 106 are addressed in more detail below.

In one implementation, a bar 150 and brushes 152 facilitate singularization. The bar 150 and brushes 152 also assist in preventing "doubles" (not shown) and undesirable material from remaining on the conveyor 102. Doubles are two or more fruit pieces that have grown together or are otherwise stuck together. As the conveyor 102 operates, doubles and/or other undesirable material falls into a trough or sluice 154 where such doubles and/or other undesirable material is swept away to juices or other area. Water jets (not shown) facilitate movement of doubles and/or other undesirable material from the trough or sluice 154. Fruit piece singularization, in conjunction with other aspects of the subject matter described herein, provides many benefits not previously possible. For example, such benefits include, but are not limited to, fewer pits per unit amount of pitted fruit pieces, faster processing of fruit pieces, and reduction in the amount of manual labor needed to process fruit pieces.

After being singularized, the fruit pieces 102 are carried through a screener or detector 108. The screener or detector 108 can perform a variety of functions such as, for example, detecting color from each fruit or detecting the presence of more than one fruit piece in a particular well 106. In an exemplary implementation, a color measurement is taken of the fruit piece 102 in each well 106 in a row of wells or depressions. The color measurements are compared against a predetermined threshold value for the color measurement. If the measured value from a particular fruit piece does not meet a corresponding acceptable threshold value, the fruit piece is ejected from the corresponding depression and is removed from the conveyor 104 before being pitted (an ejector for each well is not shown in FIG. 1). Rejected fruit pieces at this stage can be collected and further processed or discarded. Other types of measurements at the screener or detector 108 are possible such as, but not limited to, temperature, chemical composition, size, and weight. Screening is optional and may be performed prior to or after pitting. The size of the screener or detector 108 may not be shown to scale in FIG. 1 and may take up less or more space than shown in proportion to the other features of the subject matter shown in FIG. 1. Further, the screener or detector 108 may comprise one or multiple parts or sections along the conveyor 104.

Next, singularized fruit pieces 102 are carried into a pitting section 110 or region where pits or pit material is removed from the fruit pieces 102. The pitting section 110 comprises a punching head which in turn comprises a matrix bed 112 to which is attached a matrix or collection of pitting needles 114 and a wiping plate (partially shown in FIG. 8). In one implementation, the pitting needles 114 are aligned in a plurality of rows corresponding to respective links of the conveyor 104. The pitting needles 114 are preferably mounted in a fixed manner to the matrix bed 112. Alternatively, a tension spring or other flex mechanism is attached to each pitting needle 114 to avoid damage or wear to a pitting needle 114 that encounters foreign matter (anything other than a fruit piece 102) which happens to get into a well 106.

With reference to FIG. 1, each row of pitting needles 114 includes one or more alignment pins 116 which fit into a corresponding recess, passage or hole (not shown in FIG. 1) in a corresponding link of the conveyor 104. In a preferred implementation, an alignment pin 116 is similar in shape to a pitting needle 114, but does not have any features on the tip of the alignment pin 116 for engaging pits or pit material. An alignment pin 116 may be smaller than, the same, or larger in size than a pitting needle 114. One or more alignment pins 116 may be provided for each link of the conveyor 104. In a preferred implementation, two alignment pins 116 are provided for each link of the conveyor 104, one on each end of each link.

At an appropriate time during operating of the pitting machine 100, a vertical actuator 118 plunges or moves the matrix bed 112 toward a section of the conveyor 104 thereby causing alignment pins 116 to engage corresponding links of the conveyor 104 and then causing pitting needles 114 to engage and pass into or through the wells 106 in the corresponding links of the conveyor 104.

In an exemplary implementation of control of movement or operation of the pitting machine 100, the pitting section 110 comprises a matrix bed cam 120 attached to a spindle 122. In this implementation, the matrix bed cam 120 and spindle 122 rotate continuously causing the matrix bed 112 to move in a generally horizontal and reciprocating motion. The reciprocating motion allows the matrix bed 112 to move in coordination with the moving conveyor 104 such that the matrix bed 112 effectively tracks the motion of a portion of the conveyor 104 while this portion of the conveyor 104 is within the pitting section 110. The shape of the matrix bed cam 120 is carefully crafted to effectuate the tracking motion of the matrix bed 112. A motor 140 causes the conveyor 104, the spindle 122 and any related or attached cams to rotate or advance. Thus, the various components of the pitting machine 100 operate in synchronization with each other. For example, the motor 140 causes the conveyor 104 to advance in synchronization with the operation of the spindle 122 and the punching of the matrix bed 112. In this implementation, as the spindle 122 rotates, an alignment trigger cam (not shown) rotates and triggers the matrix bed 112 to partially drop toward the conveyor 104 which causes alignment pins 116 to engage respective conveyor links. The matrix bed 112 and pitting needles 114 then become more precisely aligned with the respective conveyor links. At this point in the pitting operation, as the spindle 122 continues to rotate, a matrix trigger cam 126 trips a pitting trigger 128. The pitting trigger 128, in turn, activates the vertical actuator 118 that forcefully plunges the matrix bed 112 toward the section of the conveyor 104 directly under the matrix bed 112. Pits and pit material are forcefully pushed out of the fruit pieces 102 and out of the respective wells 106. The vertical actuator 118 then withdraws the matrix bed 112 and pitting needles 114 from the wells 106 and free from the conveyor 104 as the matrix bed 112 moves horizontally in synchronization with the moving conveyor 104. The parts of the pitting machine 100 are then free to repeat the pitting cycle or pitting process.

Alternatively, alignment of the matrix bed 112 and engagement of the alignment pins 116 happens simultaneously with the operation of a single matrix trigger cam 126. In such a scenario, the alignment pins 116 are longer than the pitting needles 114 and thus the alignment pins 116 engage each link of the conveyor 104 before the pitting needles 114 engage the fruit pieces 102 in the wells 106. In this alternative implementation, the alignment and pitting are part of the same vertical actuation and motion (controlled by a single cam).

Other mechanisms may be synchronized with the operation of the conveyor 104. For example, an ejection cam 124 may trigger a row of pneumatic ejectors (not shown) near the end of the conveyor 104 to assist a pitted fruit piece 102 in leaving the conveyor.

Other implementations for coordinating the operation of the matrix bed 112 and the conveyor 104 are possible. In fact, any mechanism or combination of mechanisms for causing the same or similar motion or actuation is envisioned as part of the subject matter disclosed herein. FIG. 1 shows a rotating spindle 122 and cams to coordinate the operation of the pitting machine 100 in synchronization with operation of a variable speed motor 140. However, a programmable logic controller (PLC) could be used to control and coordinate some or all of the moving portions of the pitting machine 100 including, for example, operation of the conveyor 104 and horizontal and vertical movement of the matrix bed 112.

After the fruit pieces 102 are pitted, with reference to FIG. 1, in the fruit pitting region 110, the pitting needles 114 cause the pits or pit material to exit the fruit pieces 102 through the bottom of each corresponding well 106. The pits or pit material, and any residual fruit material leaving the fruit pieces 102, is collected in a sluice or collection region 138 under the fruit pitting region 110. The pits or pit material (not shown) can then be transported, aggregated and further processed or discarded. Fruit pieces 102 which have passed through the fruit pitting region 110 remain in their respective wells 106 of the conveyor 104.

Figure 2:
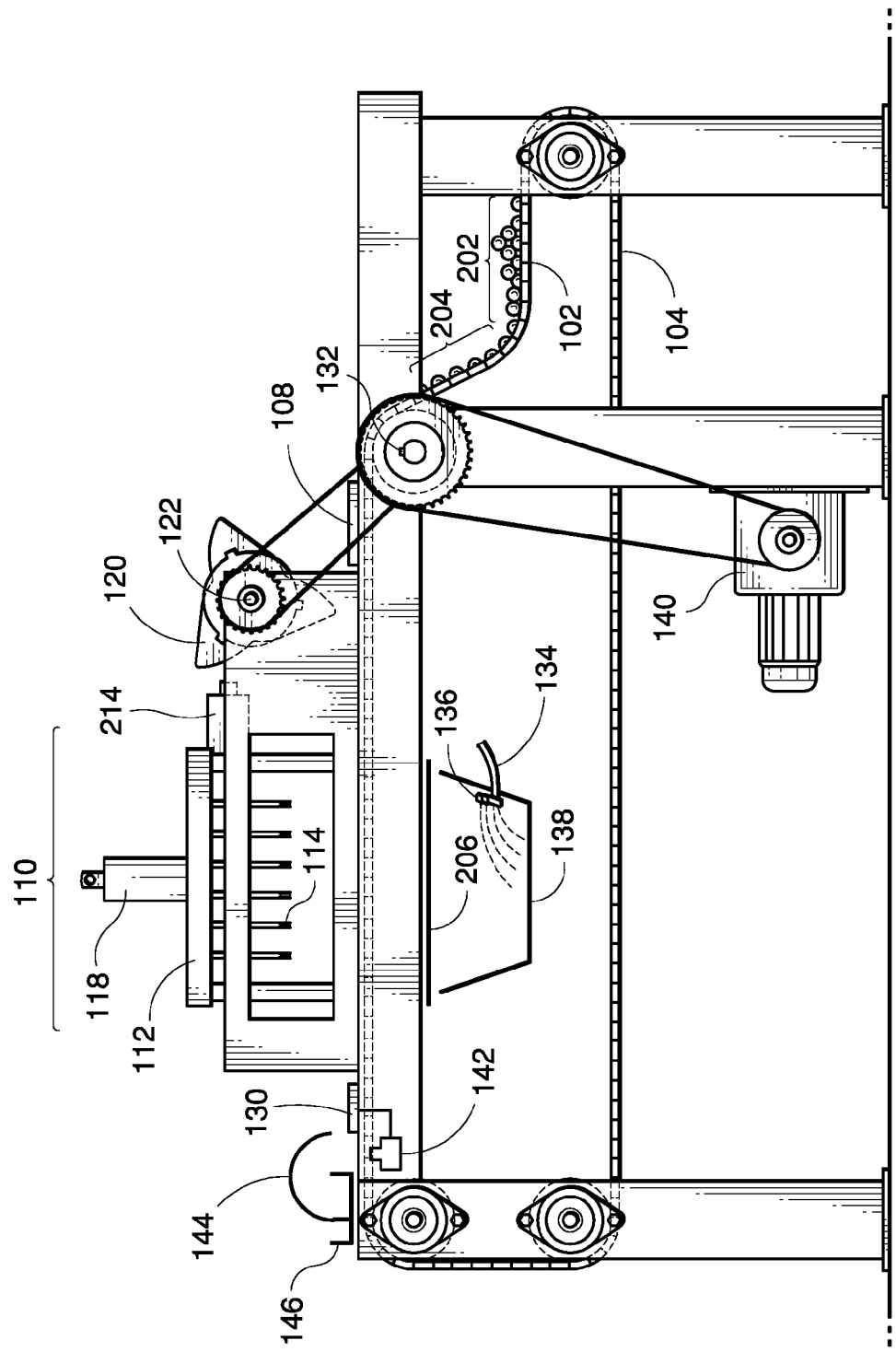
FIG. 2 is a side view of the pitting machine shown in FIG. 1 according to an exemplary implementation.
Figure 8:
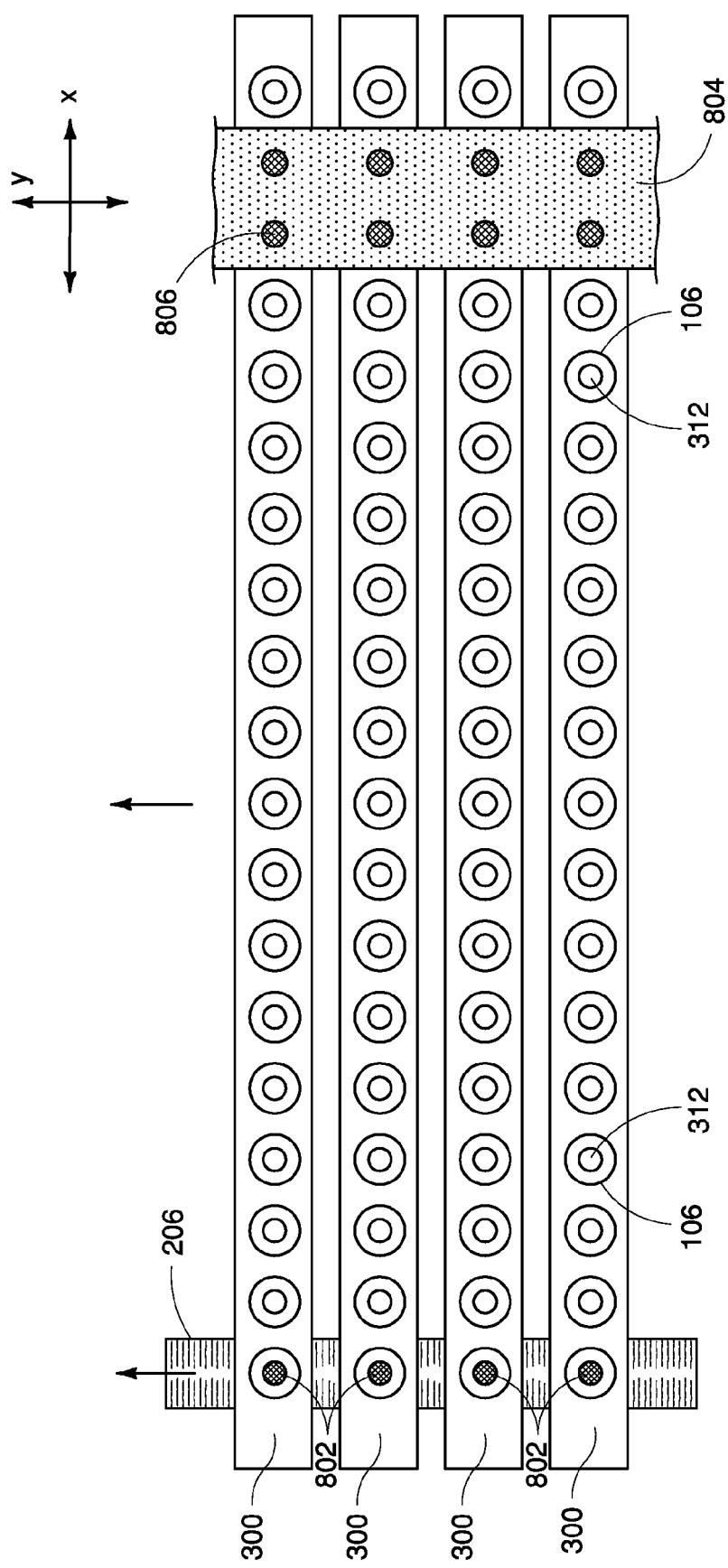
FIG. 8 is a selective overhead view of the pitting machine shown in FIG. 1 showing cleaning brushes under belt links of the conveyor for maintaining punching or pitting needles relatively free of debris during operation.

Although not shown in FIG. 1, the fruit pitting region 110 also comprises a set of brushes and one or more wiping plates, one exemplary implementation of a wiping system for the pitting needles 114. It is noted that FIG. 1 also does not show compressed air hoses that, in an exemplary implementation, provide a means for the motion of the vertical actuator 118 and other components of the pitting system or pitting machine. Elements or features not shown in FIG. 1 are omitted for clarity purposes only. The set of brushes is shown in FIG. 2 and FIG. 8 and the wiping system is explained more fully below in reference to FIG. 8. In short, a set of brushes is fixedly mounted below the conveyor 104 in the fruit pitting region 110, and one or more wiping plates are mounted to the punching head above the conveyor 104 in the fruit pitting region 110. The set of brushes removes pits or pit material as the pitting needles 114 retract from punching through the fruit pieces 102. The wiping plate helps ensure that no fruit piece 102 persists on a pitting needle 114 when the matrix of pitting needles 114 retracts from the fruit pieces 102 and wells 106.

In one implementation, the pitting machine 100 was found to process up to about 1,800 pounds (816 kg) of tart cherries per hour with each link comprising 20 wells 106 and the matrix bed 112 comprising 4 to 6 rows of pitting needles 114. About one pound (0.45 kg) of cherries was pitted on each stroke of the pitting machine 100. In this implementation, the pitting machine 100 was able to pit both tart and sweet cherries and was able to pit cherries faster than conventional means available—on the order of two to three times faster than by other known machines.

With reference to FIG. 1., the fruit pieces 102 then pass from a fruit pitting region and through a pit detection region 130. Each well 106 that passes through the pit detection region 130 is evaluated to determine whether any pit or pit material remains in a fruit piece 102 or well 106. The detection may be synchronized with or by the operation of the spindle 122. Other means to synchronize the detection with the operation of the conveyor 104 are possible. The evaluation can be performed by a variety of methods and a variety of equipment. In one implementation, an x-ray detection machine (not shown in FIG. 1) performs the evaluation. For example, an in-line, multi-line x-ray detection machine is commercially available from Smiths Detection (Alcoa, Tenn.). Other detection methods include ultrasound and infrared technologies. In a preferred implementation, infrared detection is used. The size of the pit detection region 130 and corresponding elements of detection may not be shown to scale in FIG. 1 and may take up less or more space than shown in proportion to the other features of the subject matter shown in FIG. 1.

If a pit, portion of a pit, or any pit material is detected, the corresponding well 106 can be cleared by a puff of air or other ejection means and a catch system (not shown in FIG. 1, but shown in FIG. 2). Any fruit piece 102 that is cleared can be collected and either discarded or further processed. In one implementation, any rejected fruit pieces 102 are collected and added to the pits and pit material obtained in the pitting region 110. In an exemplary implementation, the collected pits and pit material are taken to juices, meaning an area for further processing to collect and prepare juice from a subset of harvested fruit pieces (e.g. cherries).

FIG. 2 is a side view of the pitting machine 100 shown in FIG. 1. With reference to FIG. 2, the conveyor 104 operates in a counterclockwise manner. Fruit pieces 102 travel on the top of the conveyor 104 and travel from right to left in FIG. 2. In one implementation, fruit pieces 102 are loaded onto the conveyor 104 in a receiving region 202. The receiving region 202 may be of any size and orientation. In a preferred implementation, the conveyor 104 comprises an inclined region 204 wherein fruit pieces 102 become individualized or singularized in depressions or wells (not shown in FIG. 2) in the conveyor 104. As the conveyor 104 operates or advances, excess fruit pieces 102 which do not engage or lodge in depressions or wells in the conveyor 104 fall or slide back toward the receiving region 202. Means other than an inclined region 204 may be used to individualize or singularize fruit pieces 102 on a conveyor 104. For example, fruit pieces 102 may be loaded one at a time into a respective well as a conveyor 104 operates by passing fruit pieces 102 into channels or gates corresponding to the columns of wells in the conveyor 104. Alternatively, instead of an inclined region 204, fruit pieces 102 may be required to pass under a bar that is mounted at a fixed vertical distance above a horizontal conveyor 104. In such an implementation, fruit pieces 102 which do not drop into wells in the conveyor 104 are forced to remain in a receiving region 202 without advancing with the conveyor 104 to a pitting region 110.

With reference to FIG. 2, in one implementation, as the fruit pieces 102 are pitted in the pitting region 110, the tips of the pitting needles 114 pass through the respective depressions or wells and protrude through a series of brushes 206 mounted in a fixed position below the conveyor 104. As the matrix bed 112 moves from right to left in FIG. 2, the tips of the pitting needles 114 are brushed clean by brush filaments of the series of brushes 206. As fruit pitting machine 100 continuously operates, the series of brushes 206 keep the pitting needles 114 relatively free of pits, pit material and residual fruit material. The series of brushes 206 are one of the features of the pitting machine 100 that allow the pitting machine 100 to operate continuously for a relatively long period of time without a need to stop its operation for cleaning, maintenance, retooling or other reason. Continuous operation is desirable for fruit crops that require pitting or other kind of processing within a relatively narrow timeframe (e.g. a few weeks). In other implementations, instead of a fixed series of brushes 206, a set of rotating or moving brushes (not shown) may be used to keep protruding ends of pitting needles 114 free from debris. Alternatively, water jets strategically placed under the conveyor 104 in the pitting section 110 could perform the same function.

In a preferred implementation, the drive mechanism of the pitting machine 100 comprises a means or mechanism to prevent damage to the pitting needles 114 and/or other components if the drive mechanism experiences an unusual occurrence, abnormal resistance or malfunction. For example, a sheer pin 132 prevents the motor 140 from continuing operation of the pitting machine by preventing the spindle 122 from making further motion in the event of an unusual occurrence, abnormal resistance or malfunction in the mechanics of operation of the pitting machine. Any number or kind of damage preventing mechanisms may be combined with the pitting machine including mechanisms to prevent harm to human operators.

As shown in FIG. 2, the pitting machine 100 also comprises a sluice, trough or pit collector 138 for discharged pits, pit material, juice and any other material incident to pitting of fruit pieces 102. One or more water hoses 134 bring water to spray nozzles 136. The spray nozzles 136 flush water continuously or intermittently into or through the sluice, trough or pit collector 138. The material collected is sent to juices or to some other area for processing.

Once fruit pieces 102 exit the pitting region, pitted fruit pieces are checked for the presence of pits and pit material in a pit detection region 130. Detection may be done in one of various possible ways. In a preferred implementation, each well of a particular row of wells is checked. The result of a scan of each well may be used to cause an ejector 142 to eject from an identified well a rejected fruit piece. In one embodiment, the ejector 142 uses a burst or puff of air to eject a rejected fruit piece. Alternatively, a burst of water or solid pin may be used to eject or remove a rejected fruit piece from the conveyor 104. The ejector 142 sends a rejected fruit piece against a curved collecting plate 144 mounted over the conveyor 104. A second sluice, trough or pit collector 146 accepts rejected fruit pieces. In one implementation, collected rejected fruit pieces are sent to juices.

Figure 2A:
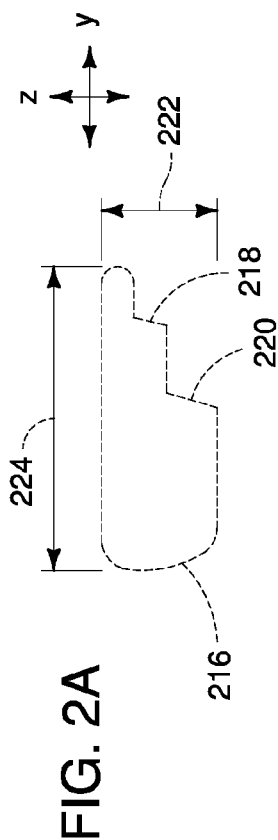
FIG. 2A is a side view of an exemplary motion of a matrix of pitting needles as the pitting machine shown in FIG. 1 operates.

FIG. 2A shows an exemplary tracking motion 216 of the matrix bed 112 and allied components shown in FIG. 2 during operation of one implementation of a pitting machine 100. In FIG. 2A, the tracking motion 216 is of any component of the moving head such as the pitting needles 114 as the head moves to track the conveyor 104 and to pit fruit pieces. The tracking motion 216 operates in a clockwise direction in FIG. 2A. The tracking motion 216 includes a first drop 218 and a second drop 220. The first drop 218 and second drop 220 have been accentuated for illustrative purposes and may be more or less gradual and larger or smaller in distance or size than shown in FIG. 2A. The first drop 218 corresponds to engagement of alignment pins attached to the matrix bed 112 with corresponding links of the conveyor 104. The second drop 220 corresponds to a downward pitting action when pitting needles 114 are forced through fruit pieces 102. The matrix bed 112 and allied components operate over both a vertical pitting distance 222 and a horizontal travel distance 224. The horizontal travel distance 224 corresponds to a y direction (direction of travel of the conveyor 104), and the vertical travel distance corresponds to a z direct as shown. The matrix bed and allied components travel horizontally so that the pitting needles 114 track the motion of the conveyor 104 prior to, during pitting of the fruit pieces 102, and removal of the pitting needles 114 from the wells and fruit pieces traveling on the conveyor. In a preferred implementation, both the vertical pitting distance 222 and the horizontal travel distance 224 are minimized so as to increase the frequency at which the pitting needles 114 can pit fruit pieces 102. In this fashion, an increased throughput of fruit pieces per time unit is obtained.

With reference to FIG. 1, FIG. 2 and FIG. 2A, in an exemplary implementation, the spindle 122 is responsible for the horizontal motion of the matrix bed 112 along the horizontal travel distance 224. The spindle 122 turns at a relatively constant angular velocity. However, the horizontal velocity of the matrix bed 112 is not constant at all times and locations due to the uneven radius and particular shape of the matrix bed cam 120. Consequently, the velocity is not constant at every place in the tracking motion 216 of FIG. 2A. The shape of the matrix bed cam 120 is specially shaped so that the motion of the matrix bed 112 tracks the motion of the conveyor 104 prior to and during pitting of the fruit pieces 102. The vertical motion of the matrix bed 112 is caused by a separate mechanism, the vertical actuator 118. The spindle 122 via the motor 140 work together in conjunction with the vertical actuator 118 to effect the tracking motion 216 shown in FIG. 2A.

Figure 3A:
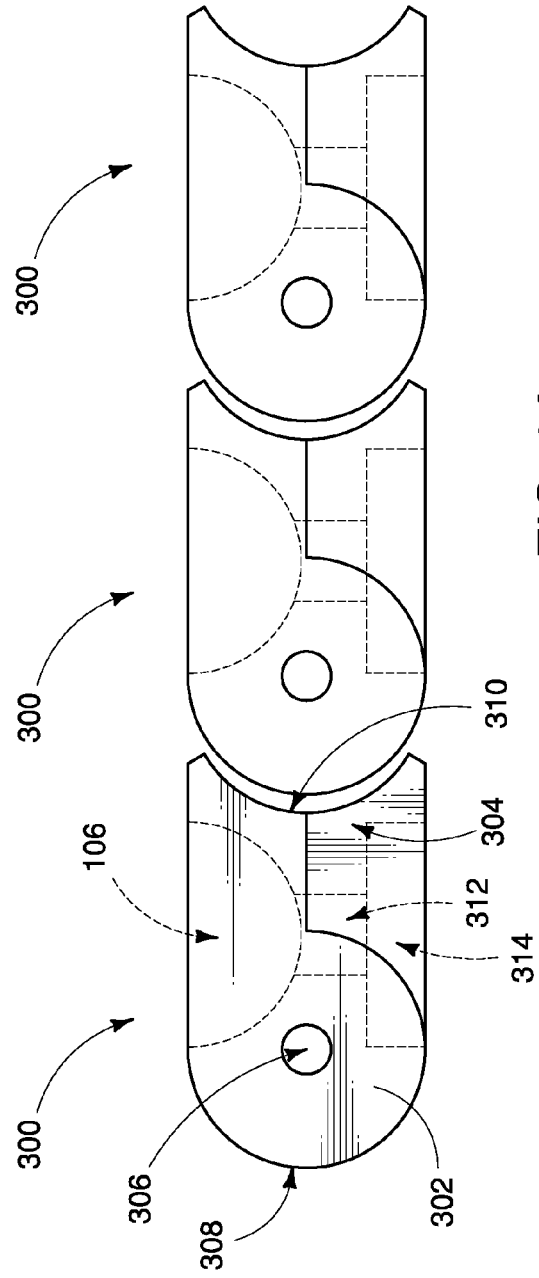
FIG. 3A is a side view of three contiguous links of a conveyor according to an exemplary implementation of the pitting machine.

FIG. 3A is a side view of three contiguous links 300 of a conveyor according to an exemplary implementation of the pitting machine. With reference to FIG. 3A, the width of each link 300 is not shown, but can be of any dimension. The width of one link 300 may be different from another link 300 as long as the distance between corresponding pitting needles in the matrix bed (not shown) corresponds to the distance between successive wells in contiguous links 300 of the conveyor.

A side surface 302 rides along the track of the pitting machine 100. A cut away portion 304 allows other parts to engage and align the conveyor 104 and conveyor links 300. A cylindrical void 306 accepts a track pin (not shown) or other mechanical part. In a preferred implementation, the links 300 are hooked together or connected by a chain link (not shown in FIG. 3A). Track pins (not shown) inserted in the cylindrical voids 306 may be attached to a wheel or other mechanism or part that allows each link 300 of the conveyor 104 to smoothly move within the pitting machine 100 and to be connected to or otherwise follow contiguous links 300.

Each link 300 also comprises a convex surface 308 and a concave surface 310. The convex surface 308 of one link 300 abuts with a corresponding concave surface 310 of another link 300. The combination of a convex surface 308 on one end of a link 300 and a concave surface 310 on the other end of the same link 300 serves a plurality of purposes including the successful operation of the conveyor 104 around curves in either orientation (up or down relative to FIG. 2). For example, the conveyor 104 is able to effectively bend in a concave-upward orientation and create an inclined section 204 as shown in FIG. 2 and to wrap around the end section 208 as shown in FIG. 2. Each conveyor link 300 is thus able to pivot in either direction around an axis centered in its cylindrical void 306. The cylindrical void 306 may be shallow or may extend through the entire link 300. A conveyor is comprised of a series of conveyor links 300 and may operate in either direction, either moving toward the convex side of the conveyor links 300 or away from the convex side of the conveyor links 300.

Figure 3:
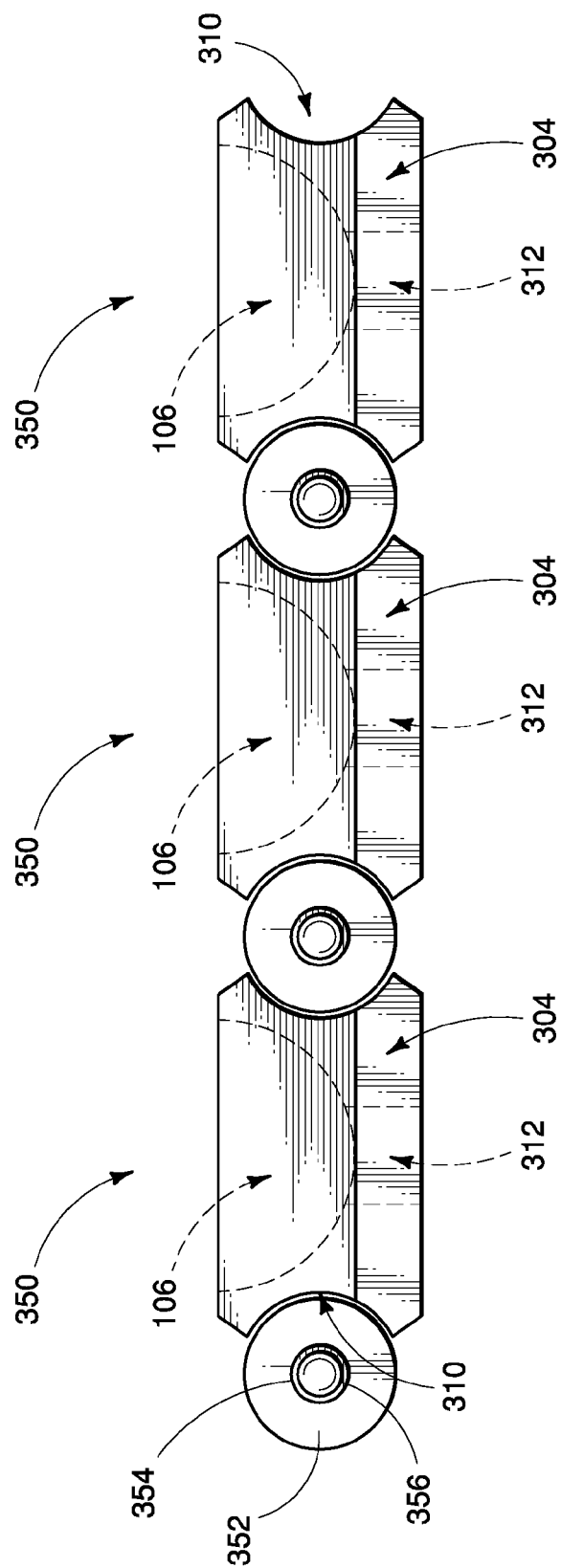
FIG. 3B is a side view of an alternative embodiment of three contiguous links of a conveyor according to an exemplary implementation of the pitting machine.

Each conveyor link 300 also comprises a plurality of wells 106. While one well 106 is shown in FIG. 3, it is understood that, in the implementation shown in FIG. 3, multiple wells 106 are present. Preferably, the length of a link 300 (perpendicular to the view shown in FIG. 3A) is sufficient to accommodate a plurality of wells 106 with a preferred number of depressions or wells being between 10 and 40.

At the bottom of each well 106 is found a pitting needle passage 312 that is slightly larger in diameter than the diameter of a pitting needle 114 (not shown) and smaller than a fruit piece (not shown in FIG. 3A). The open nature of a pitting needle passage 312 may make it possible for a detector (not shown in FIG. 3A) to more accurately sense and detect the presence of pits or pit material and to detect or measure one or more qualities of fruit pieces in the wells 106. In fact, in an exemplary implementation, detection is performed for each well 106 from the bottom of a link 300 through the pitting needle passages 312.

Further, in one exemplary implementation, an exit channel 314 is formed along some or all of the length in the underside of the link 300 along some of the width of the link 300. In other implementations, there is no exit channel 314 in each link 300. An exit channel 314 is designed to be filled with one or more removable exit channel blocks (not shown in FIG. 3A). Exit channel blocks substantially fill the exit channel 314. In a preferred implementation, a removable exit channel block is made from the same material as the link 300 and is replaced when one or more of the exit channels 314 shows signs of excessive wear. Wear occurs as the pitting machine 100 is operated and as pitting needles pass through the pitting needle passages 312 and through corresponding channels or openings in the removable exit channel block (not shown) which accommodate the passage of the pitting needles.

In an alternative implementation, a removable exit channel block is made from a different material than that used to make a link 300, a material that exhibits different wear characteristics than those of the link material. The properties of the removable exit channel material can be carefully tailored to the fruit that is being pitted and to the shape and material of the pitting needles used in the pitting operation. The properties of the material used to make the removable exit channel block also can be carefully matched to pitting operating conditions such as to conveyor speed and punching frequency.

In a preferred implementation, each link 300 is made from an ultra high molecular weight (UHMW) polyethylene. Components made of UHMW polyethylene exhibit a preferred combination of properties for pitting fruit pieces. UHMW polyethylene has high abrasion resistance, low coefficient of friction, self-lubrication, a non-adherent surface, good chemical fatigue and impact resistance, and good noise dampening properties. UHMW polyethylene is very resistant to wear and abrasion. UHMW polyethylene is also a material that satisfies relevant requirements of the U.S. Federal Food and Drug Administration (FDA) and U.S. Department of Agriculture (USDA). Alternatively, each link 300 is made from a high density polyethylene (HDPE), polyurethane or nylon material.

FIG. 3B is a side view of three contiguous links 350 and three conveyor rods 352 of a conveyor 104 according to a second exemplary implementation of a pitting machine. With reference to FIG. 3B, the width of each link 350 is not shown, but can be of any dimension so long as it is sufficient to accommodate a well 106 and exit passage 312. The width of one link 350 may be different from another link 350 as long as the distance between corresponding pitting needles in the matrix bed (not shown) corresponds to the distance between successive wells in contiguous links 350 of the conveyor. The length of a link 350 (perpendicular to the view shown in FIG. 3B) may be of any dimension.

In a preferred implementation, each link 350 is made from an UHMW polyethylene. When mounted in the conveyor 104, each link 350 floats or is sandwiched between successive conveyor rods 352. Each link 350 is thus somewhat isolated from the mechanical assembly of the conveyor 104 and is somewhat isolated from the tracking or motion of the conveyor 104. Thus, each link has some freedom to move and to tightly align with the matrix head 112 and with a row of pitting needles 114 when a link 350 moves into the pitting region 110 of the pitting machine.

Each side of a link 350 comprises a concave surface 310 to interface with a corresponding conveyor rod 352. With reference to FIG. 3B, each link 350 may thus rotate in either direction (up or down) relative to an axis defined by an adjacent conveyor rod 352 when a second adjacent conveyor rod 352 moves up or down vertically during operation of the conveyor 104. Each link 350 optionally comprises a cut away portion 304 which allows other parts of a pitting machine (not shown) to avoid, engage, align with or manipulate the conveyor links 350. For example, teeth of a sprocket comprising part of the conveyor 104 may engage in the cut away portions 304 as links 350 pass over the sprocket. Each end of a conveyor rod 352 comprises a shoulder 354 and a narrowed end 356. The narrowed end 356 is preferably threaded to accept a nut or other part.

FIG. 4A is an overhead view of a conveyor link 300 of a conveyor 104 according to an exemplary implementation of the invention and as shown in FIG. 3A. Other implementations of a link 300 are possible. With reference to FIG. 4A, a plurality of wells 106 are aligned in a row along the length of the conveyor link 300. In the bottom of each of the wells 106 is a pitting needle passage 312 which is slightly larger than the diameter of a corresponding pitting needle (not shown) and smaller than a fruit piece (not shown). A conveyor link 300 optionally comprises an alignment channel 402 formed near each end of the conveyor link 300. As a pitting machine operates, an alignment pin (not shown in FIG. 4A) passes into its corresponding alignment channel 402 causing the matrix (not shown in FIG. 4A) and pitting needles (not shown in FIG. 4A) to directly and precisely align with one or more links 300 under the matrix. As the matrix moves downward toward the one or more conveyor links 300, alignment pins engage corresponding alignment channels 402 prior to the pitting needles engaging the wells 106 and passing into the pitting needle passages 312. In this way, the pitting needles are more precisely aligned with the one or more conveyor links 300 than merely synchronizing the passage of pitting needles into pitting needle passages 312 through the use of cams or other means. Thus, wear along the sides of the pitting needle passages 312 is avoided.

In operation, pitting needles puncture fruit pieces, engage pits of fruit pieces, and push through the fruit pieces and into corresponding pitting needle passages 312. A pitting needle passage 312 must accommodate a pit, pit material and residual connected fruit material in addition to a pitting needle. Thus, a pitting needle passage 312 is preferably not as closely matched in diameter, as is the alignment pin to its corresponding alignment channel 402. Accordingly, pitting needles ordinarily do not strongly contact the sides of pitting needle passages 312. The use of alignment pins and alignment channels 402 reduces wear in the belt links 300 associated with pitting needles passing into or through pitting needle passages 312.

FIG. 4B is an overhead view of links 350 and conveyor rods 352 shown in FIG. 3B according to a second and preferred exemplary implementation of the pitting machine 100. With reference to FIG. 4B, each link 350 comprises one or more alignment channels 402, such as, for example, on each end of each link 350. Alignment channels 402 may be located in any place and in any orientation in each link 350. The links 350 are conveyed or moved through the pitting machine 100 by advancing the conveyor rods 352. The conveyor rods 352 are held in place relative to one another with rod links 404 and with nuts 406 placed on the ends of each conveyor rod 352. While rod links 404 are shown connected to contiguous links 350, other arrangements are possible such as by connecting three contiguous links 350 together. While a single link 350 is shown stretching from left to right, a conveyor 104 may support multiple links 350 across a single row between successive conveyor rods 352. Alignment pins could then align each link 350 as one or more rows of links 350 pass into a pitting section 110 of a pitting machine 100.

Figure 5:
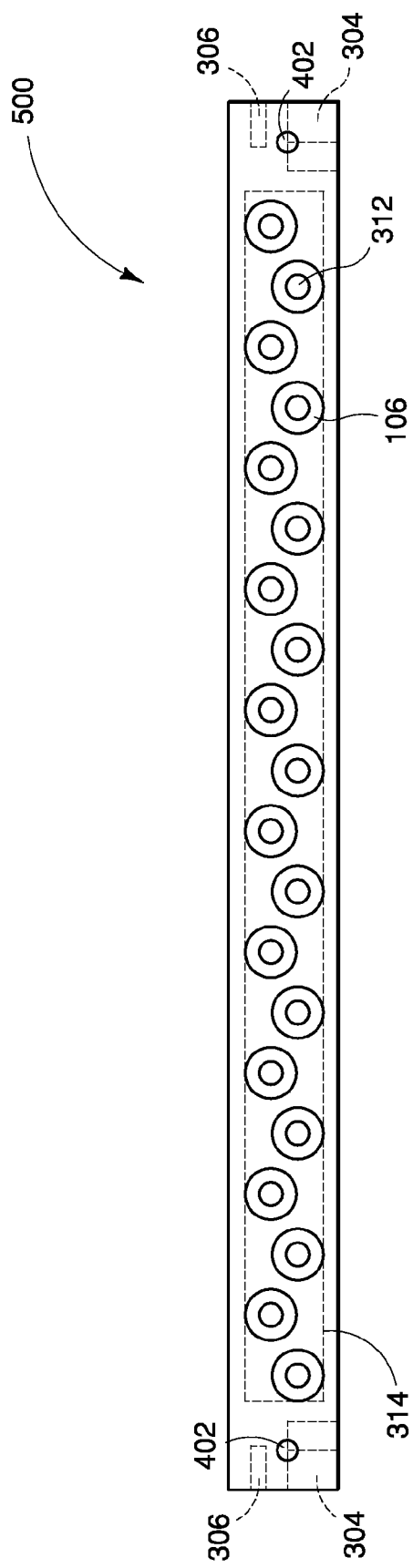
FIG. 5 is an overhead view of a link of a conveyor according to another exemplary implementation of the pitting machine.

FIG. 5 is an overhead view of another exemplary implementation of a conveyor link 500 comprising a series of wells 106 which are offset from one another in a y-direction along the length of the conveyor link 500. When wells 106 are offset from one another, for a given link 500, a greater number of wells 106 can be formed in a given link 500. Fewer links 500 for a conveyor 104 could be used in such an implementation. Spacer conveyor links (not shown in FIG. 5) that do not have any wells can then be used between a series of conveyor links 500 shown in FIG. 5.

Any arrangement of wells 106 is possible. Each conveyor link 500 may need to be larger in the x-dimension or y-dimension in order to accommodate other configurations of wells 106. Of course a corresponding matrix of pitting needles 114 would need to be modified to match a corresponding configuration of wells 106 such as those shown in FIG. 5.

A conveyor link 500 also comprises a cutaway portion 304 and cylindrical voids 306 which accept a pin (not shown) or other part for connecting conveyor links 500 together to form a conveyor or for causing the conveyor link 500 to move during operation of the pitting machine 100. Each of the wells 106 comprises or is contiguous with a pitting needle passage 312.

Figure 6:
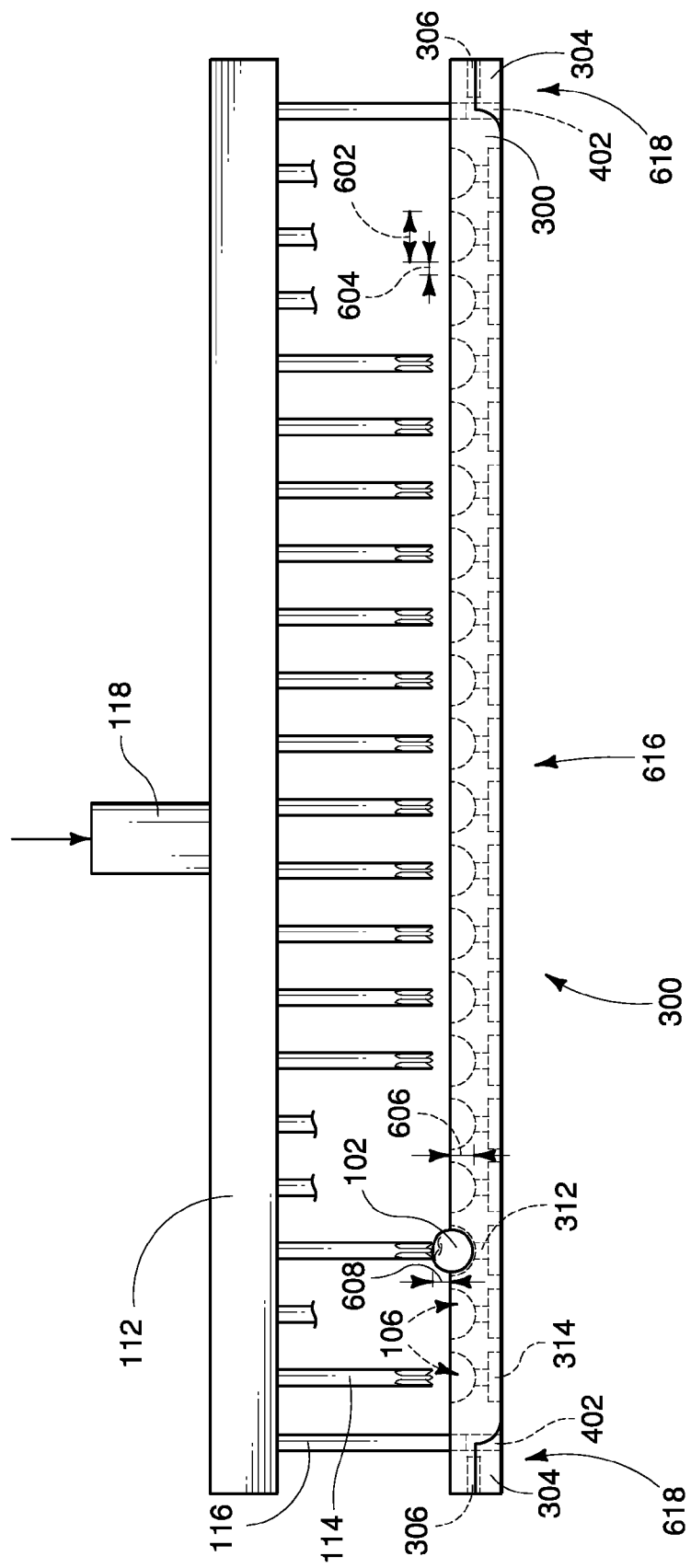
FIG. 6 is a side view of a link of the conveyor shown in FIG. 3A and a side view of a matrix of pitting needles according to an exemplary implementation of the pitting machine.

FIG. 6 is a side view along a length of the exemplary conveyor link 300 shown in FIG. 3A and FIG. 4A. The view shown in FIG. 6 is toward the concave side of the conveyor link 300. With reference to FIG. 6, a cut away portion 304 is visible on each end of the conveyor link 300. The cut away portion 304 allows other parts (not shown) to avoid, engage, align with or manipulate the conveyor links 300. Cylindrical voids 306 in each end are shown by dotted lines. Alignment channels 402, vertically situated, are similarly shown by dotted lines, one near each end of the conveyor link 300. An alignment pin 116 is shown engaged into each of the corresponding alignment channels 402. A single row of pitting needles 114 is shown attached to the matrix bed 112 with the understanding that the matrix bed 112, in a preferred implementation, comprises multiple rows of pitting needles 114. In FIG. 6, the working end of each pitting needle 114 is shown directly above its corresponding well 106 and corresponding pitting needle passage 312. Each pitting needle passage 312 opens downward onto a corresponding and contiguous exit channel 314, each exit channel 314 being block shaped in FIG. 6.

From a side view, the plurality of wells 106, the pitting needle passages 312 and exit channels 314 are not visible and are shown by dotted lines. A fruit piece 102 is shown in one of the wells 106. When the pitting machine operates, the matrix bed 112 moves up and down by way of a vertical actuator 118. Other mechanisms to move the matrix bed 112 up and down are possible.

As shown in FIG. 6, the alignment pins 116 have engaged the alignment channels 402 thereby precisely aligning the corresponding conveyor link 300 in both an x-direction (left-right) and y-direction (forward and backward—perpendicular to the plane of FIG. 6) relative to corresponding wells 106 and pitting needle passages 312. As shown in FIG. 6, the pitting needles 114 have not engaged the fruit piece 102 and have not engaged the wells 106.

The shape of each well 106 may be the same or varied as compared with the shape of other wells 106. The shape of the wells 106 shown in FIG. 6 is semicircular, but could be any other shape. The shape of wells 106 may depend on any number of factors and may be selected or formed depending on characteristics of fruit pieces to be pitted. For example, the shape may be parabolic, elliptical, conical or frustoconical in nature. The contour of each well 106 is shown as a smooth surface. However, the semicircular surface may be formed with ridges, divots, bumps, or some form of texture in order to yield desirable results when pitting a particular fruit. For cherries, it is preferable to use a relatively smooth surface in the wells 106.

The size or diameter 602 of each well 106 shown in FIG. 6 is uniform from well 106 to well 106. However, the size or diameter 602 may vary from well 106 to well 106 and may vary according to position in any given conveyor link 300. For example, the size or diameter 602 of the wells 106 may be larger in the center 616 of the conveyor link 300 and the size or diameter 602 of the wells 106 may be smaller toward the ends 618 of the conveyor link 300 as compared to an average size or diameter of the depressions in the particular conveyor link 300. In another implementation, the size of the wells may vary from one conveyor link 300 to another conveyor link 300. In this way, various sizes of fruit piece may be accommodated more easily or more rapidly such that the average residence time for a fruit piece of a given size being lower in the loading or inclined region or area 204 of the pitting machine 100 when there is varying sizes of wells 106 in the conveyor. Fruit pieces of different sizes may be directed to wells of a corresponding size for improved pitting.

The separation distance 604 between any two wells 106 is shown as uniform in FIG. 6, but can be varied between consecutive wells 106. The variation in separation distance 604 may vary in any direction such as in an x-direction or y-direction or a combination of x-direction and y-direction. The arrangement of wells 106 may be done on any basis such as to maximize throughput of fruit pieces (relatively high packing fraction in two dimensions (e.g. x and y dimensions)) or for cleaning of pitting needles 114 or for some other reason. In a preferred implementation, wells 106, and correspondingly pitting needles 114, are arranged one directly in front of the other in a y-direction (perpendicular to the plane of FIG. 6) so as to facilitate cleaning of the tips of the pitting needles 114 by brushes (as described further below).

In a preferred implementation, and as shown in FIG. 6, a depression depth 606 is a uniform size or depth across the conveyor link 300. However, the depression depth 606 may vary from well 106 to well 106, across a conveyor link 300 and from conveyor link to conveyor link in the conveyor. Variation in depression depth 606 would allow a uniform matrix of pitting needles 114 to contact each fruit piece 102 at a slightly different time during operation and is desirable in certain circumstances. Thus, during operation, the load on the components and vertical actuator 118 which pit the fruit pieces 102 would not spike when the pitting needles 114 impact the pits of the fruit pieces 102. However, when the depression depth 606 is uniform across a single conveyor link 300 and from conveyor link to conveyor link, resistance across the matrix 112 is uniform and loading of fruit pieces 102 onto the conveyor 104 is more predictable and uniform. A uniform depression depth 606 is also desirable in manufacturing of conveyor links 300. An actual depression depth 606 that is optimal for a particular type of fruit piece or particular crop of fruit (size of fruit piece) is obtained by trial and error.

In one implementation, the depression depth 606 is found by measuring when a majority of the pit of a particular type of fruit piece 102 is within the well 106 which leaves an amount of fruit exposed above the top plane of the conveyor link 300. The distance of the fruit piece 102 above the top plane is referred to as an exposed distance 608. When the fruit pieces 102 pass under the matrix 112 of pitting needles 114 to be pitted, the tips of the pitting needles 114 must be at a distance greater than the exposed distance 608. In addition, a wiping plate (not shown in FIG. 6) also must be located at a distance greater than the exposed distance so that the wiping plate does not impact the fruit pieces 102 as the fruit pieces 102 pass under the wiping plate.

After the fruit pieces 102 are pitted, the fruit pieces 102 are generally slightly compressed into the wells 106 and generally do not protrude to the same exposed distance 608 as when first entering the pitting area 110. In one implementation, the front edge of wiping plate can show signs of wear where fruit pieces that exhibit an abnormally large exposed distance 608 impact the wiping plate as they pass into the pitting section 110 of the pitting machine 100.

Figure 7:
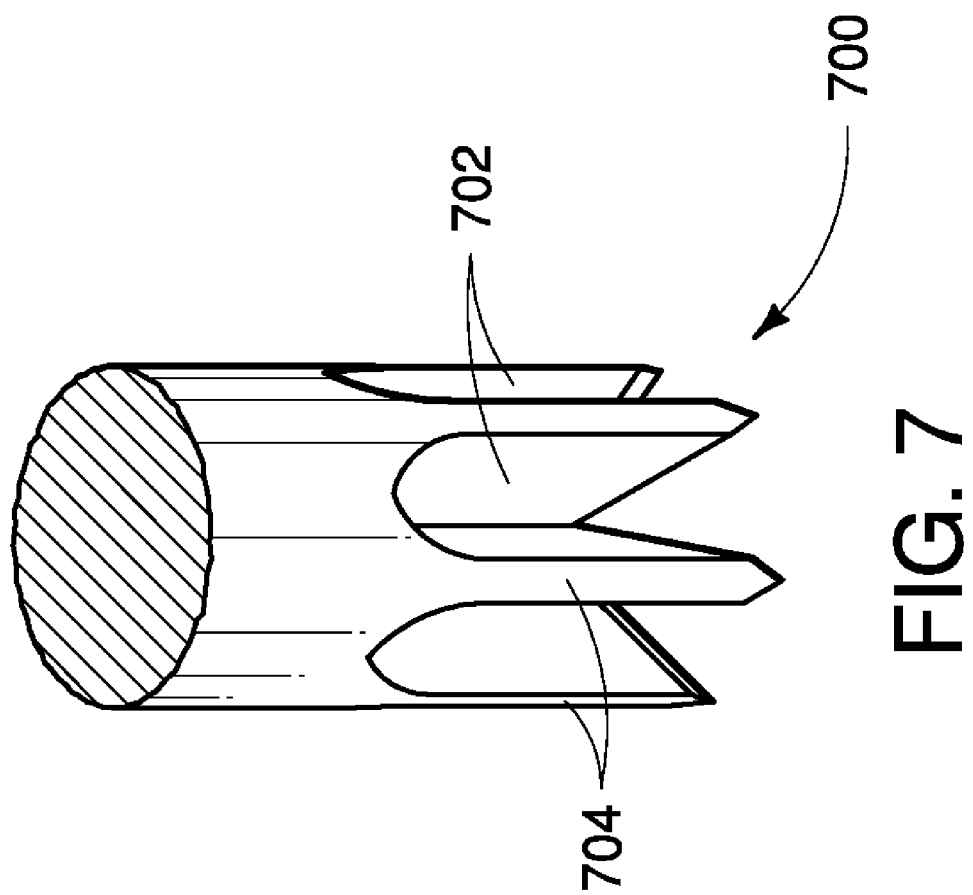
FIG. 7 is a perspective close up view of a portion of an individual pitting needle according to an exemplary implementation of the pitting machine.

FIG. 7 is a perspective close up view of an individual pitting needle 114 according to an exemplary implementation of a pitting needle 114 designed for pitting a singularized fruit piece 102. In a preferred implementation, pitting needles 114 are made from a stainless steel. However, each pitting needle 114 or portions of pitting needles may be made from other materials such as UHMW polyethylene and coated carbon fiber.

With reference to FIG. 7, according to one implementation, the tip of a pitting needle 700 is formed by creating multiple grooves 702 in a cylinder or rod. FIG. 7 shows six symmetrical grooves 702 formed in the shaft of the pitting needle 700. The grooves 702 form blades 704 that extend downward toward the tip 706 of the pitting needle 700. Other numbers of grooves 702 and blades 704 are possible. The tip 706 of the pitting needle 700 is generally concave which allows the tip 706 to engage a pit or pit material and drive the pit or pit material toward the center of the pitting needle 700 instead of toward the outside diameter of the pitting needle 700. A pit or pitting material that is pushed even slightly toward the outer diameter or surface of the shaft of the pitting needle 700 (and thus protrudes outside of a profile of the pitting needle 700) can cause the pit or pit material to rub against the needle passage 312 of a conveyor link 300 of the pitting machine and thus can either cause unnecessary wear of the needle passage 312, the pitting needle 700, or may allow the pit or pit material to escape the pitting process and remain in the fruit piece 102 or in a well 106. None of such outcomes is desirable. Improved pitting is obtained by using pitting needles according to the design shown in FIG. 7.

FIG. 8 is a partial overhead view of the pitting machine shown in FIG. 1 showing a partial set of cleaning brushes 206 under links 300 of the conveyor 104 for maintaining pitting needles 114 relatively free of debris during operation of the pitting machine 100. For simplicity of illustration, only a partial set of cleaning brushes 206 is shown with an understanding that each column of wells 106 would travel over a set of corresponding cleaning brushes. Also for simplicity of illustration, only four links 300 of a conveyor 104 are shown. Solid or dark circles represent pitting needle tips 802 which have passed through fruit pieces (not shown) and wells 106. Only four pitting needle tips 802 are shown for simplicity.

In operation, the pitting needle tips 802 and links 300 travel in synchronization in the direction shown (toward the y direction shown in FIG. 8) while the cleaning brushes 206 are mounted to the machine 100. In one implementation, cleaning brushes 206 are fixed above or near open channels in a plate (not shown) just under the conveyor 104. The cleaning brushes 206 remain stationary as the pitting machine 100 is operated. As the pitting needle tips 802 move during operation of the pitting machine, the pitting needle tips 802 impact bristles of the cleaning brushes 206 thereby removing pits, pit material and associated pulp, skin and other material that is carried on the pitting needle tips 802. Further, in one implementation, pitting needle tips 802 pass through the cleaning brushes 206 and are further wiped off as the pitting needle tips 802 travel vertically down and back up through the cleaning brushes 206.

In FIG. 8, as the pitting machine operates and as the matrix head 112 moves, the pitting needle tips 802 travel vertically through the bristles of the cleaning brushes 206. The debris on each pitting needle tip 802 comes from the fruit pieces as the pitting needle tips 802 pass through the fruit pieces, through the wells 106, through the pitting needle passages 312 and protrude from the bottom of the links 300. The bristles of the cleaning brushes 206 are sufficiently stiff to adequately remove most or all of the debris from the channels and concave recess of each of the pitting needle tips 802 on each pass of the pitting needle tips 802. A cleaning mechanism other than fixedly mounted bristled cleaning brushes 206 could be employed. For example, spraying jets of water or rotating brushes could be used. Pits, pit material and other matter cleaned from the pitting needle tips 802 drop into a sluice, trough or collection region 138 below the cleaning brushes 206.

FIG. 8 also shows a partial portion of a wiping plate 804 covering two columns of wells 106. Needle shaft openings 806 allow the passage of needle tips 802 through the wiping plate 804. The wiping plate 804 is situated or mounted above the conveyor 104 in the pitting section 110 of the pitting machine 100. In the implementation of FIG. 8, the wiping plate 804 is attached to, and travels with, the movable punching head. In alternative embodiments, the wiping plate 804 may be fixedly attached to the pitting machine 100 and the needle shaft openings would be slots through which the needle tips 802 would pass as the pitting machine 100 operated. In either implementation, the wiping plate 804 serves to dislodge, as necessary, any fruit piece 102 from needle tips 802 as the needle tips 802 withdraw from the wells 106. The cleaning brushes 206 and wiping plate 804 enable continuous cyclical operation of pitting needles removing pits and pit material from fruit pieces 102.

The foregoing discussion has been presented for purposes of illustration and description. The description is not intended to limit the invention to the form or forms disclosed herein. Consequently, variation and modification commensurate with the above teachings, within the skill and knowledge of the relevant art, are within the scope of the present invention. The implementations described herein and above are further intended to explain the best mode presently known of practicing the invention and to enable others skilled in the art to utilize the invention as such, or in other implementations, and with the various modifications required by their particular application or uses of the invention. It is intended that the appended claims be construed to include alternate implementations to the extent permitted.

The invention claimed is:

1. A pitting machine for removing pit material from fruit pieces, the pitting machine comprising:
   a conveyor comprising a plurality of conveyor links, wherein each conveyor link of a plurality of conveyor links comprises a set of wells for accepting a fruit piece, wherein each well is contiguous with a needle aperture of sufficient size to accept passage of a pitting needle through the respective well and through a corresponding needle aperture, and wherein the conveyor continuously operates at a relatively constant speed; and
   a punching head comprising a matrix of pitting needles positioned near the conveyor, the punching head and a corresponding portion of the conveyor forming a fruit pitting area, wherein the punching head is capable of intermittently aligning with the corresponding portion of the conveyor as the conveyor advances, wherein the punching head intermittently punches the matrix of pitting needles through the wells and through corresponding needle apertures of the wells of the corresponding portion of the conveyor as the conveyor advances, the punching of the matrix of pitting needles thereby attempting to remove pit material from fruit pieces which reside in respective wells of the corresponding plurality of conveyor links, wherein intermittent punching of the punching head and motion of the punching head are synchronized with motion of the conveyor in the pitting area such that the pitting needles pass through any fruit pieces in respective wells of the corresponding plurality of conveyor links as the conveyor operates, wherein the punching head travels in sync with the corresponding portion of the conveyor, and wherein one or more alignment pins engage each of the plurality of conveyor links corresponding to the said corresponding portion of the conveyor and corresponding to each row of the matrix of pitting needles prior to any tip of a pitting needle passing into a respective needle aperture of a respective well.

2. The machine of claim 1 wherein the conveyor continually operates, wherein the conveyor is a closed loop conveyor, wherein the conveyor is configured to form a loading area, and wherein the loading area comprises a portion of the conveyor where wells in the conveyor each may acquire a single fruit piece as the conveyor operates.

3. The machine of claim 2 wherein at least a portion of the loading area is inclined.

4. The machine of claim 1 further comprising a fruit piece screener located ahead of the pitting area, the fruit piece screener comprising:
   a detector which obtains a quality measurement of each fruit piece which is resident in a respective well of the conveyor which passes near the detector; and
   a fruit piece rejector capable of removing a fruit piece from the respective well of the conveyor link when the quality measurement of the fruit piece does not meet or exceed a quality threshold value.

5. The machine of claim 4 wherein the fruit piece rejector removes a fruit piece prior to the fruit piece entering the fruit pitting area when the quality measurement of the fruit piece does not meet or exceed the quality threshold value.

6. The machine of claim 1 further comprising a pit material detector located downstream from the pitting area, the pit material detector capable of attempting to detect pit material in fruit pieces located in the wells of conveyor links.

7. The machine of claim 6 wherein the pit material detector comprises an infrared camera.

8. The machine of claim 6 further comprising a rejector configured to reject any fruit piece when the pit material detector detects the presence of a threshold amount of pit material in a fruit piece located in a respective well of an identified conveyor link.

9. The machine of claim 8 wherein the rejector delivers a puff of air sufficient to remove an identified fruit piece out of its respective well and off of the conveyor.

10. The machine of claim 1 further comprising a set of brushes, wherein the set of brushes are located near the distal openings of the needle apertures, wherein the set of brushes are configured to contact the pitting needles as the pitting needles protrude through the needle apertures, wherein the set of brushes are configured to clear excess fruit and pit material from each of the pitting needles after each punch through the fruit pieces.

11. The machine of claim 1 wherein each conveyor link comprises an exit channel and wherein an exit channel block is removably affixed in the exit channel of each conveyor link.

12. The machine of claim 11 wherein the exit channel block is made from a different material than a material used to make the conveyor link, wherein the different material is more wear resistant than the material used to make the conveyor link.

13. The machine of claim 11 wherein the corresponding portion of the conveyor comprises a plurality of conveyor links.

14. The machine of claim 1 wherein said alignment pins cause the pitting needles to align more precisely with said needle apertures of the wells than without use of said alignment pins.

15. A fruit pitting machine for removing pit material from fruit pieces, the fruit pitting machine comprising:
    a means for individualizing and distributing fruit pieces into a plurality of rows;
    a means for simultaneously attempting to remove pit material from each of the fruit pieces while the fruit pieces are maintained in the plurality of rows, the plurality of rows continuously moving as part of a continuous pitting process;
    a means for aligning the means for simultaneously attempting to remove pit material from each of the fruit pieces, the means for aligning performing its function prior to the means for simultaneously attempting to remove pit material completing its function; and a means for detecting pit material in each piece which has exited a region comprising the means for simultaneously attempting to remove pit material.

16. The fruit pitting machine of claim 15, wherein the means for simultaneously attempting to remove pit material comprises a matrix of pitting needles, wherein the pitting needles are made of a stainless steel.

17. The fruit pitting machine of claim 15, wherein the means for individualizing and distributing fruit pieces comprises a series of wells, each well receiving an individual fruit piece.

18. The fruit pitting machine of claim 15, wherein the means for aligning aligns the means for individualizing and distributing fruit pieces with the means for simultaneously attempting to remove pit material from each of the fruit pieces.

19. A method for removing pit material from fruit pieces, the method comprising:
   placing a fruit piece into each of a plurality of wells of a continuously operating conveyor, the continuously operating conveyor comprising a plurality of rows of wells for receiving fruit pieces, wherein each well is contiguous with a needle aperture of sufficient size to accept passage of a pitting needle through the respective well;
   operating the continuously operating conveyor at a relatively constant speed;
   intermittently advancing a punching head in synchronization with the operating of the continuously operating conveyor, wherein the punching head includes a matrix of pitting needles and at least one alignment pins for each of said plurality of rows;
   aligning a plurality of rows of the continuously operating conveyor with the advancing punching head by engaging said at least one alignment pin into each of said plurality of rows of wells;
   attempting to remove pit material from a plurality of fruit pieces in respective wells of said plurality of rows of wells by passing said matrix of pitting needles into the respective wells and into said needle apertures; and
   withdrawing said matrix of pitting needles and alignment pins from said plurality of rows of the continuously operating conveyor.

20. The method of claim 19, the method further comprising:
   after attempting to remove pit material from the plurality of fruit pieces, attempting to detect whether pit material is present in any well of the plurality of rows of wells;
   identifying each particular well found to have a threshold value of pit material; and
   removing a fruit piece from each of said identified wells.

21. The method of claim 19, wherein said placing one fruit piece into each of the plurality of wells comprises forming an inclined loading area in the continuously operating conveyor.

* * * * *